April 12, 1932. W. H. GRUENHAGEN 1,854,027
JUNE BUG BAIT
Filed Sept. 8, 1930
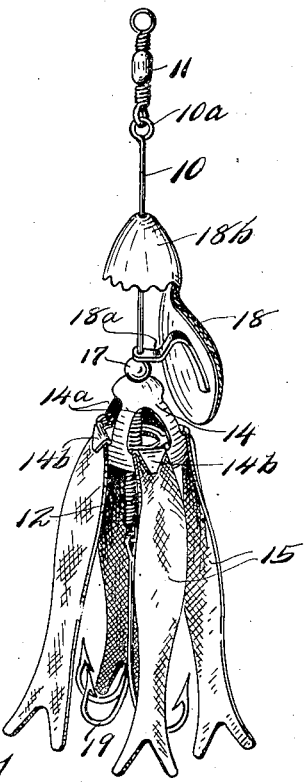
Fig. 1
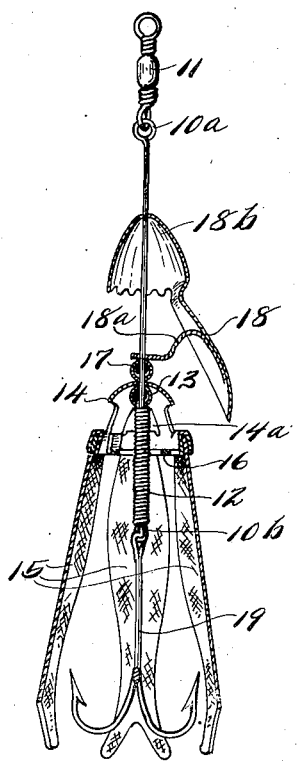
Fig. 2
Fig. 9
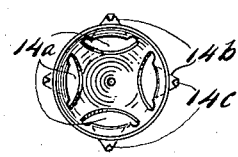
Fig. 4
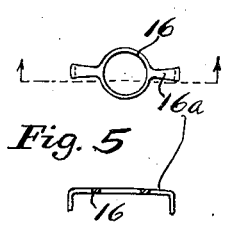
Fig. 5
Fig. 3
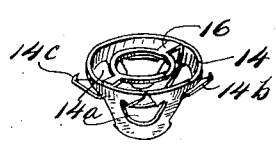
Fig. 7
Fig. 8
Fig. 6
INVENTOR
WILLIAM H. GRUENHAGEN
BY
Reif & Braddock
ATTORNEY Patented Apr. 12, 1932

1,854,027

UNITED STATES PATENT OFFICE

WILLIAM H. GRUENHAGEN, OF ST. PAUL, MINNESOTA

JUNE BUG BAIT

Application filed September 8, 1930. Serial No. 480,398.

This invention relates to a bait, and particularly to an artificial fish bait. It is desirable, in a bait or lure, to have means simulating a live minnow, and for this purpose, various colors are used on artificial baits, the most commonly used combination being red and white. It is desirable, also, to have means for causing a flash of light caused by a rotating member as the bait moves through the water. It is also desirable to have a bait which can be made at comparatively small expense, which is simple in construction. It is also a desideratum to have a hook device used with the bait more or less concealed.

It is an object of this invention, therefore, to provide a bait or lure comprising a member of general annular shape, from which depend or trail a plurality of circumferentially spaced flexible tabs or streamers, preferably of different color.

It is another object of the invention to provide a bait or lure having a shank with a spoon mounted thereon, constructed and arranged to gyrate rather than to rotate uniformly.

It is another object of the invention to provide a bait comprising a shank having a spoon device at its upper or further end, and an inverted cup shaped member below or in the rear of said spoon, said cup shaped member having a plurality of tabs or streamers secured thereto, together with a hook device carried between said tabs or streamers.

It is still another object of the invention to provide a bait or lure comprising an inverted cup shaped member to which tabs or streamers are applied, said member being of novel and efficient construction.

It is further an object of the invention to provide a bait comprising a shank reversely bent to form an eye, and having a helix or wire spring embracing the shank and the reversely bent portion thereof.

It is still another object of the invention to provide a bait or lure comprising a shank to which the line is attached, a spoon device rotatably mounted on said shank, an inverted cup shaped member mounted on said shank below said spoon, a plurality of tabs or streamers secured to and depending from said cup shaped member, together with a hook device secured to said shank and disposed below said cup shaped member.

These and other objects and advantages of the invention will be fully set forth in the following description made in connection with the accompanying drawings, in which like reference characters refer to similar parts throughout the several views, and in which:—

Fig. 1 is a view in side elevation of the bait;

Fig. 2 is a central vertical section of the bait;

Fig. 3 is a central vertical section through an element showing the same before the bait is completed;

Fig. 4 is an inverted plan view of said element showing the same before the same is completed;

Fig. 5 is a plan view of the guide member used;

Fig. 6 is a central vertical section through the cup shaped member with the guide means secured thereto;

Fig. 7 is a perspective view of the cup shaped member and guide member, showing the same as they are placed in their final form;

Fig. 8 is a vertical section taken on line 8—8 of Fig. 5; and

Fig. 9 is a central vertical section at the lower portion of the shank used.

Referring to the drawings, a bait is shown, comprising a shank 10 which is made of a small wire or rod of comparatively rigid but somewhat resilient material. Shank 10 is formed with an eyelet 10a at its upper end, in which is secured a swivel member 11 adapted to have the line attached in the eye at its upper end. Shank 10 is reversely bent adjacent its other end to form an eye or loop 10b, the reversely bent portion of the shank extending alongside the main portion, and both portions being embraced in a helix 12 of comparatively small wire or a wire spring. A bead or small ball 13 has a diametral opening through which shank 10 passes, said bead resting on top of the helix 12. A member 14 has an opening at its top through which the shank 10 passes, said member 14 resting on bead 13 so as to be easily rotatable thereon about said shank. Member 14 is of inverted cup shape or of semi-elipsoidal shape. Member 14 has openings 14a formed in the sides thereof, and tongues 14b are struck or punched from the sides of member 14. Tongues 14b are of substantially triangular shape, having points at their free ends, and these points 14c are bent inwardly substantially at a right angle as shown in Figs. 3, 4 and 7. The lugs 14b are bent outwardly and downwardly against the lower annular portion of member 14 and the upper ends of tabs or streamers 15 are secured between said tongues and the lower portion of member 14, the points 14c piercing these tabs or streamers. It will be seen that member 14 comprises a lower annular portion with circumferentially spaced arms extending upwardly and inwardly therefrom, connected at their upper ends by means pierced by the shank 10. The tabs or streamers 15 are somewhat fish shape, as shown in Figs. 1 and 2, having diverging tapering portions at their lower ends. The members 15 are formed of some easily flexible material, and while various materials may be used for this purpose, in practice the bait has been made with tabs or streamers of red and white flannel or felt. The member 14 has a guide ring 16 for shank 10, and member 12 secured therein, the same being shown as disposed substantially at the lower edge of member 14. Member 16 as shown in Figs. 5 and 8 has a central ring portion and arm 16a at each side thereof, the ends of which are bent at right angles and secured to member 14 by soldering or welding. Another ball or bead 17 is pierced by the shank 10 and disposed above member 14. An arm 18a is pierced by the shank 10 and rests on the ball 17, said arm being soldered or otherwise suitably secured to the inner side of a spoon member 18 which extends downwardly and outwardly at one side of the shank 10. The spoon 18 is connected to a rounded conical member 18b, the same being shown as integral with spoon 18. Member 18b is substantially cylindrical at its lower side, and the edge is scalloped as shown in Figs. 1 and 2. The shank 10 passes through the top portion of member 18b, and a hole through said member, and the hole through arm 18a are so arranged that conical member 18b is eccentrically disposed on shank 10, or in other words, is more at one side of said shank than the other. The hook device shown as a triple hook 19, is swingingly mounted in the loop 10b at the lower end of shank 10.

In operation the bait will be drawn through the water by the line attached to the swivel 11. The action of the water on spoon 18 causes the same to revolve with the cone 18b. Owing to the eccentric mounting of the cone 18b, the same and the spring 18 gyrate around the shank 10 instead of rotating uniformly. This gyration gives the appearance of lateral vibration, or side to side movement due to the fact that member 18b is wider at one side than the other, which adds greatly to the lure of the bait. In other words, the rotation about shank 10 is uneven. The cone 18b acts to deflect weeds and grass and thus to form a path therethrough for the bait. The water passes over member 14 and will pass through the openings 14a and through the inside of said member between the streamers 15. The streamers 15 are vibrated or fluttered in the water as the bait is drawn therethrough, and member 14 can rotate on the shank 10 if there is any tendency for it to rotate. The water passing through member 14 holds the streamers 15 substantially in the position shown in the Figs. 1 and 2. The hook 19 moves in the rear of or below the member 14 and between the streamers 15. The hook is thus largely obscured as the bait is in operation, and when the fish strikes at the streamers 15, he is practically sure to be caught on the hook. The member 18 can be moved upwardly on shank 10, together with members 17, 14 and 13, so that spoon 12 can be moved off of the end of shank 10 and the hook 19 released from loop 10b. A single hook can be substituted for the hook 19 and the bait used as a June bug spinner, or as a bait spoon. A minnow or frog would be placed on the single hook.

From the above description it is seen that applicant has provided a simple and efficient bait or lure. The same can be made at comparatively small expense, and is also strong and durable. The same has been amply demonstrated in actual practice and found to be very successful.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. An artificial fish bait having in combination, a shank, a conical member eccentrically supported for rotation on said shank, a spoon carried at one side of said member, and a hook device supported on said shank.

2. An artificial fish bait having in combination, a conical member, a spoon carried at one side of said conical member, a member secured to said spoon through which said shank passes, said shank passing longitudinally of said conical member at one side of the axis thereof.

3. An artificial fish bait having in combination, an annular member having an opening of comparatively large area adjacent its periphery through which water can freely pass, and a plurality of flexible tabs or streamers secured in circumferential relation to and depending from said member, between which water passes through said annular member to hold said streamers in separated position and a hook device below said annular member.

4. The structure set forth in claim 3, a shank extending through said annular member, and a guide means for said shank carried by and enclosed by said annular member and spaced from the wall thereof, said hook device being swingingly secured to the end of said shank between said tabs or streamers.

5. An artificial fish bait having in combination, a shank, a member of substantially semi-ellipsoidal form mounted substantially axially on said shank, circumferentially spaced openings in the sides of said member, and a plurality of flexible tabs or streamers secured to the lower portion of said member and depending therefrom, and a hook device supported by said shank.

6. The structure set forth in claim 5, said tabs or streamers being secured respectively below each of said openings.

7. An artificial fish bait having in combination, a shank, an inverted cup shaped member mounted substantially axially on said rod, the same having lugs struck up from its sides, and a plurality of tabs or streamers secured to said member, said lugs being bent to clamp said tabs or streamers between the same and said member.

8. The structure set forth in claim 7, said lugs being pointed at their free ends and having the bends thereof turned in slightly, said tabs or streamers being pierced by said points.

9. An artificial fish bait having in combination, a shank, an inverted cup shaped member through the top of which said shank passes, said member having circumferentially spaced openings through its sides and having secured at its edge a plurality of circumferentially arranged tabs or streamers secured to the lower portion of said member and depending therefrom, and a hook device carried by said shank below said member.

10. An artificial fish bait having in combination, a shank having an eye at its lower end, a hook device swingingly mounted in said eye, a sleeve member encircling said shank above said eye, a bead on said shank supported by said sleeve, an inverted hollow cup shaped member mounted on said shank and supported on said bead, streamers carried by the lower edge of said cup shaped member, said cup-shaped member having comparatively large openings in its sides through which water may pass to the inner side of said streamers, and means for securing a line at the top of said shank.

11. The structure set forth in claim 10, and a bead above and supported by said cup-shaped member, a cone shaped member having a spoon extending outwardly and downwardly at one side having an inwardly extending arm through which said shank passes, supported on said last mentioned bead above said inverted cup shaped member for rotation on said shank the lower end of said spoon being disposed at the side of said cup-shaped member.

12. An artificial fish bait having in combination, a shank, an annular member surrounding said shank, circumferentially spaced arms extending upwardly from said member, means to which the upper ends of said arms are connected, and through which said shank passes, and streamers carried by said annular member.

13. An artificial fish bait having in combination, a ring, a shank passing substantially axially through said ring, means carried by said ring above the same through which said shank passes and by which said ring is supported on said shank, and a plurality of circumferentially arranged flexible tabs depending from said ring.

14. The structure set forth in claim 13, a guide means supported by said ring adjacent the center thereof embracing said shank and spaced from the wall of said ring.

15. An artificial fish bait having in combination, a shank, a conical member having an aperture in its top through which said shank passes, a spoon extending downwardly and outwardly from one side of said member and having an arm extending inwardly with an aperture therein through which said shank passes, said aperture being so disposed that said cone is eccentrically mounted on said shank whereby rotation of said cone simulates a lateral vibration thereof.

16. An artificial fish lure having in combination, an annular member, means extending from the periphery of said member upwardly and inwardly and forming a supporting means for said member, there being openings between said means for water to pass freely through said annular member, a plurality of tabs or streamers secured to and depending from said annular member, said tabs or streamers being maintained in separated condition by the water passing through said annular member, means on which said annular member is supported, and a hook disposed adjacent said tabs.

WILLIAM H. GRUENHAGEN.